Patented Dec. 14, 1948

2,456,288

UNITED STATES PATENT OFFICE 2,456,288

PROCESS OF DYEING NYLON-ACETATE MIXED FABRIC WITH 3-NITRO-4-AMINO-2'-CHLOROBIPHENYL

Jean G. Kern, Orchard Park, N. Y., assignor to Allied Chemical & Dye Corporation, New York, N. Y., a corporation of New York No Drawing. Application May 4, 1945, Serial No. 592,073

4 Claims. (Cl. 8—24)

This invention relates to the dyeing of synthetic fiber-forming linear polyamide material, and more specifically, to the dyeing of mixed fabrics containing synthetic linear polyamide fibers and organic cellulose derivative fibers.

The terms "synthetic fiber-forming linear polyamide material" and "synthetic linear polyamide fibers" denote and include linear superpolymers of amino-carboxylic acids, copolymers of an aliphatic diamine and an aliphatic dicarboxylic acid, and interpolymers of the aforesaid amino-acids with dicarboxylic acids and diamines, and fibers prepared from these polymers, such as are described in United States Patents 2,071,250, 2,071,253, 2,130,523 and 2,130,948 to W. H. Carothers. An example of such materials is a linear copolymer of adipic acid and hexamethylene-diamine, known commercially as "nylon."

The term "organic cellulose derivative fiber" denotes and includes fibers of cellulose esters (such as cellulose formate or acetate) and of cellulose ethers (such as ethyl or methyl ethers of cellulose).

It was known heretofore that water-insoluble organic dyestuffs which are applicable in aqueous dispersion for the dyeing of organic cellulose derivatives, especially cellulose acetate fiber, in many cases are also applicable for the coloration of synthetic fiber-forming linear polyamide materials such as nylon. However, frequently the coloration produced by a dyestuff on the latter material differs considerably in shade and fastness properties from the coloration produced by the same dyestuff on the cellulose derivative. (See Society of Dyers and Colourists, volume 60, No. 8 (August 1944) page 207, column 1.)

It was also heretofore known to dye cellulose acetate fibers fast brilliant greenish-yellow shades by means of aqueous dispersions of commercial dyestuffs such as, the monoazo dyestuff obtained by coupling diazotized aniline with 2,4-dihydroxy-quinoline, shaded with a small amount of 1-nitro-acridone; and the monoazo dyestuff obtained by coupling diazotized 3-nitro-aniline with N-methyl-4-hydroxy-2-quinolone. When these dyestuffs are employed for the dyeing of nylon, dyeings of similar greenish-yellow shade are produced, but the resulting colorations are considerably inferior in fastness to light as compared with those produced on cellulose acetate.

The deficiency in fastness to light of these dyestuffs on nylon constitutes a serious disadvantage. For example, when the dyestuffs are applied in dyeing a mixed fabric containing synthetic linear polyamide fiber such as nylon, together with organic cellulose derivative fiber, such as cellulose acetate, the resulting coloration, while initially uniform, becomes uneven on exposure to light owing to the inferior fastness of the coloration on polyamide fiber.

I have now discovered that synthetic fiber-forming linear polyamide material, especially nylon, can be dyed in fast greenish-yellow shades, and that organic cellulose derivative fiber, for example cellulose acetate, can be dyed in shades identical with those produced on the polyamide material, by applying to these materials an aqueous dispersion of a 3-nitro-4-amino-2'-halogeno-biphenyl, particularly 3-nitro-4-amino-2'-chlorobiphenyl and 3-nitro-4-amino-2'-bromobiphenyl. Thus, I have found that by applying an aqueous dispersion of 3-nitro-4-amino-2'-chlorobiphenyl to synthetic linear polyamide material, especially nylon, and to organic cellulose derivative material, e. g. cellulose acetate fiber, these materials can be dyed in identical greenish-yellow shades. Moreover, the shades thus obtained are substantially identical with those produced by applying the commercial dyestuffs referred to above to the aforesaid materials. However, as distinguished from the latter dyestuffs, the shades produced on synthetic linear polyamide fiber, such as nylon, with 3-nitro-4-amino-2'-chlorobiphenyl, are not only equal in shade to those obtained on organic cellulose derivatives, but are also equal in fastness to light. Accordingly, 3-nitro-4-amino-2'-chlorobiphenyl can be advantageously applied in aqueous dispersion for the coloration of mixed fabrics containing synthetic linear polyamide fiber together with organic cellulose derivative fiber, for example, nylon-cellulose acetate mixed fabrics, in uniform fast greenish-yellow shades which remain substantially uniform upon exposure to light.

The following example, wherein parts are by weight, illustrates the method of employing the dyestuffs according to the invention:

Example 3-nitro-4-amino-2'-chlorobiphenyl (prepared, for example, by acetylating 4-amino-2'-chlorobiphenyl, nitrating the resulting 4-acetylamino-2'-chlorobiphenyl by heating to 70° to 80° C. with a mixture of concentrated nitric acid, glacial acetic acid and acetic anhydride, removing the N-acetyl group from the resulting nitrated product by heating with 70% sulfuric acid, and recovering 3-nitro-4-amino-2'-chlorobiphenyl by drowning the mixture in water, filtering, and crystallizing the filter cake from alcohol) is ground in a mortar with an equal weight of dextrine until a fine, substantially homogeneous powder is obtained.

0.15 part of this powder is added to 200 parts of water and the resulting dispersion is heated with agitation to 190° F. Five parts of a nylon textile fabric are immersed in the dye-bath, dyed therein for 45 minutes, rinsed with water, and dried. The fabric is dyed a bright greenish-yellow shade, possessing excellent tinctorial strength and fastness to light.

Cellulose acetate fiber can be dyed in the same manner as nylon, the shade obtained being substantially identical with that produced on nylon and having the same fastness to light. Thus, when the dyestuff described in the example is applied to mixed fabric containing nylon and cellulose acetate fiber, e. g. by the procedure described in the example, uniform bright greenish-yellow shades are produced which remain uniform when exposed to light.

While greenish-yellow shades substantially identical with those obtained in the foregoing example can be produced on nylon and on cellulose acetate with the commercial dyestuffs referred to above, the shades thus produced on nylon are considerably inferior in fastness to light to those produced on cellulose acetate with the same dyestuff, and to those produced on nylon with the dyestuff of this invention according to the foregoing example.

Variations and modifications may be made in the foregoing example without departing from the scope of the invention. Thus, instead of 3-nitro-4-amino-2'-chlorobiphenyl, 3-nitro-4-amino-2'-bromobiphenyl can be employed as described in the example, for dyeing nylon and cellulose acetate fiber in greenish-yellow shades having the advantageous color and fastness properties obtained in the example. Other synthetic fiber-forming linear polyamide materials in the form of fiber or fabric can be dyed with a 3-nitro-4-amino-2'-halogeno-biphenyl, and especially with 3-nitro-4-amino-2'-chloro-biphenyl by the process of this invention, by applying the dyestuff to the aforesaid materials in the form of an aqueous dispersion. Organic cellulose derivative material, e. g., esters or ethers of cellulose, like cellulose acetate, can be similarly dyed. The dyestuff compositions empoyed for dyeing according to the invention may be prepared with various dispersing agents, with or without protective colloids or other dyestuff composition ingredients; for example, those employed for making aqueous dispersions of dyestuffs for cellulose acetate. The dyestuffs of this invention can also be employed for printing fabrics containing synthetic linear polyamide fiber with or without organic cellulose derivative fiber, by applying the dyestuff, dispersed in a printing paste containing a thickening agent or protective colloid, to the fabric.

I claim:

1. A process for the coloration of a mixed fabric containing synthetic linear polyamide fiber and organic cellulose derivative fiber, which comprises applying to said fabric an aqueous dispersion of 3-nitro-4-amino-2'-chlorobiphenyl, whereby said fabric is colored a uniform, fast greenish-yellow shade.

2. A process for the coloration of a mixed fabric containing nylon fiber and cellulose acetate fiber, which comprises applying to said fabric an aqueous dispersion of 3-nitro-4-amino-2'-chlorobiphenyl, whereby said fabric is colored a uniform, fast greenish-yellow shade.

3. A mixed fabric containing synthetic linear polyamide fiber and organic cellulose derivative fiber having 3-nitro-4-amino-2'-chlorobiphenyl uniformly incorporated therewith as a dye, whereby said fabric is dyed uniform greenish-yellow shades having uniform fastness to light.

4. A mixed fabric containing nylon fiber and cellulose acetate fiber having 3-nitro-4-amino-2'-chlorobiphenyl uniformly incorporated therewith as a dye, whereby said fabric is dyed uniform greenish-yellow shades having uniform fastness to light.

JEAN G. KERN.

REFERENCES CITED

The following references are of record in the file of this patent:

UNITED STATES PATENTS

| Number | Name | Date |
|---|---|---|
| 2,010,883 | Olpin | Aug. 13, 1935 |

OTHER REFERENCES

Acetate Rayon, by Synfil, Textile Colorist for Dec. 1943, pages 551, 552.